US008689158B2

(12) United States Patent
Kalafala et al.

(10) Patent No.: US 8,689,158 B2
(45) Date of Patent: Apr. 1, 2014

(54) SYSTEM AND METHOD FOR PERFORMING STATIC TIMING ANALYSIS IN THE PRESENCE OF CORRELATIONS BETWEEN ASSERTED ARRIVAL TIMES

(75) Inventors: Kerim Kalafala, Rhinebeck, NY (US); Jennifer E. Basile, Poughkeepsie, NY (US); David J. Hathaway, Underhill, VT (US); Jeffrey G. Hemmett, St. George, VT (US); Peihua Qi, Wappingers Falls, NY (US); Natesan Venkateswaran, Hopewell Junction, NY (US); Chandramouli Visweswariah, Croton-on-Hudson, NY (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 12/944,059

(22) Filed: Nov. 11, 2010

(65) Prior Publication Data

US 2012/0124534 A1     May 17, 2012

(51) Int. Cl.
*G06F 17/50* (2006.01)
(52) U.S. Cl.
USPC .......................................................... 716/113

(58) Field of Classification Search
USPC .......................................................... 716/113
See application file for complete search history.

(56) References Cited

U.S. PATENT DOCUMENTS

| 5,636,372 | A | * | 6/1997 | Hathaway et al. | 713/500 |
| 2004/0230921 | A1 | * | 11/2004 | Hathaway et al. | 716/2 |
| 2009/0222780 | A1 | * | 9/2009 | Smith | 716/6 |
| 2010/0050141 | A1 | * | 2/2010 | Kanno | 716/6 |

OTHER PUBLICATIONS

"A Comprehensive Solution for True Hierarchical Timing and Crosstalk Delay Signoff", Rajagopal, et al.; IEEE 2006, 19th International Conference on VLSI Design (VLSID'06).

* cited by examiner

*Primary Examiner* — Vuthe Siek
*Assistant Examiner* — Aric Lin
(74) *Attorney, Agent, or Firm* — H. Daniel Schnurmann

(57) ABSTRACT

A method of applying common path credit in a static timing analysis in the presence of correlations between asserted arrival times, comprising the steps of using a computer, identifying one or more pairs of asserted arrival times for which one or more correlations exist; propagating to each of the one or more pairs of asserted arrival times a timing value dependent on the one or more correlations; and performing a subsequent common path pessimism removal analysis for at least one test during which a timing value dependent on the one or more correlations between asserted arrival times is used to compute an adjusted test slack.

17 Claims, 4 Drawing Sheets

SYSTEM AND METHOD FOR PERFORMING STATIC TIMING ANALYSIS IN THE PRESENCE OF CORRELATIONS BETWEEN ASSERTED ARRIVAL TIMES

FIELD OF THE INVENTION

The present invention generally relates to the field of Design Automation of semiconductor chips, and more particularly, to a system and method for determining a common path credit due to correlations between asserted arrival times.

BACKGROUND OF THE INVENTION

Static timing analysis (STA) has been widely in industry to determine the latest and earliest possible switching times of various signals within a digital circuit. STA may generally be performed at the transistor level or at the gate level, using pre-characterized library elements, or at higher levels of abstraction, for complex hierarchical chips.

STA algorithms operate by first levelizing the logic structure, and breaking any loops in order to create a directed acyclic graph (timing graph). Modern designs can often contain millions of placeable objects, with corresponding timing graphs having millions, if not tens of millions of nodes. For each node, a corresponding arrival time, transition rate (slew), and required arrival time are computed for both rising and falling transitions as well early and late mode analysis. An arrival time (AT) represents the latest or earliest time at which a signal can transition due to the entire upstream fan-in cone. The slew value is the transition rate associated with a corresponding AT, and a required arrival time (RAT) represents the latest or earliest time at which a signal may transition to satisfy all timing constraints in the entire downstream fan-out cone.

AT's are propagated forward in a levelized manner, starting from the design primary input asserted (i.e., user-specified) arrival times, and ending at either primary output ports or intermediate storage elements. For single fan-in cases, AT sink node=AT source node+delay from source to sink.

whenever multiple signals merge, each fan-in contributes a potential arrival time computed as AT sink (potential)=AT source+delay, making it possible for the maximum (late mode) or minimum (early mode) of all potential arrival times to be retained at the sink node. Typically an exact delay value for an edge in a timing graph is not known, but instead only a range of possible delay values can be determined between some minimum delay and maximum delay. In this case, maximum delays are used to compute late mode arrival times and minimum delays are used to compute early mode arrival times.

RATs are computed in a backward levelized manner starting from either asserted required arrival times at the design primary output pins, or from tests. Tests are constraints between pairs of early and late ATs, e.g., setup or hold constraints at internal storage devices. For single fan-out cases, RAT source node=RAT sink node−delay.

When multiple fan-outs merge (or when a test is present), each fan-out (or test) contributes a prospective RAT, enabling the minimum (late mode) or maximum (early mode) required arrival time to be retained at the source node. When only a range of possible delay values can be determined, maximum delay are used to compute late mode required arrival times and minimum delays are used to compute early mode required arrival times.

The difference between the arrival time and required arrival time at a node (i.e., RAT−AT in late mode, and AT−RAT in early mode) is referred to as slack. A positive slack implies that the current arrival time at a given node meets all downstream timing constraints, and a negative slack implies that the arrival time fails at least one such downstream timing constraint. A timing point may include multiple such AT, RAT, and slew values, each denoted with a separate tag, in order to represent data associated with different clock domains (i.e., launched by different clock signals), or for the purpose of distinguishing information for a specific subset of an entire fan-in cone or fan-out cone.

Static timing analysis may also deal with statistical values for ATs, RATs, delays, and other quantities, rather than simple scalar values. In one statistical analysis method each delay $D_X$ is modeled as $D_X = D_{X0} + D_{X1}P_1 + \ldots D_{XN}p_N + D_{XR}\Delta R$, where $D_{X0}$ is a mean value, $D_{X1}, \ldots D_{XN}$ are a set of sensitivity values to a corresponding set $p_1, \ldots p_N$ of independent zero-mean unit-variance random variables representing independent effects (e.g., voltage, temperature, device thresholds, etc.) that can cause various amounts of variation in delays in the network, and $D_{XR}$ is the sensitivity of $D_X$ to a separate independent random variable $\Delta R$ for each delay that is uncorrelated with variations in other delays. Statistical addition or subtraction of a pair of timing values is performed by adding or subtracting corresponding mean and correlated sensitivity values, and computing the RSS (root sum square) of the independent random sensitivities, e.g., $A-B=(A_0-B_0)+(A_1-B_1)p_1 + \ldots (A_N-B_N)p_N + \text{sqrt}(A_R^2+B_R^2)\Delta R$.

Due to the impacts of process variability, the common path pessimism removal (CPPR) algorithm, which is described in U.S. Pat. No. 5,636,372 to Hathaway, et. al is an integral component of static timing analysis in order to provide credit for physically common portions of launch and capture data paths feeding a downstream test. In general, the CPPR analysis consists of a path tracing component, wherein common circuit elements feeding both early and late mode arrival times at a downstream test are identified, and credit is computed based on a cancellable difference in early vs. late delays or arrival times for said common circuit elements. In modern chip hierarchical design, however, there are increasing cases where external correlations exist between different asserted arrival times (typically for clock signals), which otherwise would not be considered common circuit elements by prior art CPPR methods, and therefore there is a need for a system and method for performing common path pessimism removal which accounts for correlations between asserted arrival times. Although the CPPR analysis process is described herein as tracing individual paths, it will be understood that alternative embodiments exist, including embodiments that identify data and clock sub-graphs that contain multiple paths originating at a common point, and the CPPR credit analysis methods described herein apply equally to these embodiments.

One such example which illustrates the need to account for correlations between asserted arrival times during CPPR analysis is that of hierarchical static timing analysis, which is used in order to divide analysis of a large design in to smaller and more manageable segments. In one style of hierarchical analysis, a design is partitioned into various modules which are analyzed independently (also referred hereinafter as "out of context" analysis), using asserted input arrival times and output required arrival times. A reduced abstract model is subsequently generated which may remove internal latch to latch logic, and full design timing is subsequently performed using reduced abstract models. During out of context timing analysis, it is generally necessary to run the CPPR algorithm in order to remove undue pessimism from timing slacks in cases where launch and capture paths share common logic, and/or statistical adjustment can be applied to independently random delays in the non-common launching and capture paths. One type of statistical adjustment is RSS credit, in which the independent random contributions from the delays common to the launch and capture paths is removed from the RSS computed independent random portion of the test slack. In some cases, e.g., where a design partition contains multiple clock inputs, it is possible that the aforementioned launching and capturing paths trace back to a pair of different asserted arrival times at the macro boundary, in which case the CPPR algorithm needs external information regarding said different asserted arrival times at macro boundary in order to properly compute credit is due for a downstream test.

Prior art approaches to the aforementioned problem either disallow the interaction between different asserted arrival times, which limits the set of designs for which hierarchical techniques can be fully leveraged, or by require margining to account for the inability to accurately compute CPPR credit in such cases.

One such prior art method handles hierarchical STA including certain limited aspects of CPPR implications by focusing on the need to ensure that the actual early/late arrival time difference for a given pair of signals adjusted by the appropriate CPPR credit (e.g., from an analysis of a pair of clock paths feeding a module instance to be analyzed out of context) is less than the difference in the asserted arrival of those same signals applied for out of context block-level timing. However, there are two problems with the prior art methodologies. First, for multiple interacting clock domains, it is impossible to ensure that all such constraints can be met using absolute arrival times and without introducing additional pessimism.

By way of example, assume three macro input clock arrival times A,B,C, for which the proper early/late arrival time difference (including appropriate CPPR adjust) are identical for all three pairs of signals are identical, i.e., AT(A)−AT(B)=k, AT(A)−AT(C)=k, and AT(B)−AT(C)=k.

It is evident that algebraically, it is not possible to select a consistent set of values for AT(A), AT(B), AT(C) that satisfies all the above equalizers. As a result, using prior art techniques, some additional pessimism must be built in, typically by transforming the equalities above to inequalities, which then results in a requirement to close on timing based on a larger effective clock skew than actually necessary.

Furthermore, the prior art is moot regarding dealing with CPPR analyses within a statistical framework wherein along the non-common path a) statistical adjustment of random delay, and b) cancellation of globally correlated sources of variability become important aspects.

In another illustrative example, designs employing a combination of clock grids and clock trees often contain arrival time assertions at the root of each local clock tree (which are in turn generally fed from a common clock grid), wherein an early/late arrival time difference is introduced in order to account for a worst-case clock grid skew. In such a scenario it is possible that a launch and capture path feeding a downstream test originate from two different local clock trees, however, due to underlying correlations (e.g., physical proximity) it may be considered overly pessimistic to apply a worst-case clock grid skew, and therefore there is a need for a system and method capable of providing CPPR credit due to correlations between different asserted clock arrival times originating from different points in the clock grid.

In a closely related example, an additional early/late arrival time difference may be applied to selected transitions (i.e., rise or fall) at asserted arrival time points in order to account for half-cycle penalties. For example, in order to add timing margin for half-cycle paths, one technique is to apply an additional adjust to the (early or late, or both) trailing clock transition(s) of asserted clock arrival times. In so doing, Lead to Trail, Trail to Lead, and Trail to Trail paths are subject to additional timing margin. Since the intention is to penalize only half-cycle paths, it is subsequently necessary to give credit back for launch and capture path-pairs which both originate back to a Trailing transition asserted clock arrival time. In the case where said asserted Trailing transition clock arrival times correspond to different nodes within the timing graph for the early and late mode paths, there is a need for a system and method capable of providing CPPR credit due to correlations between different asserted arrival times.

Therefore, considering the above cases, there is a need for a system and a method capable of providing the necessary computations of the CPPR credit due to correlations between asserted arrival times, which does not introduce excess pessimism, and further which is amenable to performing statistical CPPR analysis.

SUMMARY OF THE INVENTION

In one embodiment, the invention provides a system and a method for computing a common path credit during a statistical timing analysis, wherein for one or more pair of asserted arrival times, a common path adjust due to correlations between asserted arrival times is pre-computed.

In another aspect of an embodiment of the invention, during a subsequent common path pessimism credit (CPPR) analysis, the method and system employ the pre-computed common path adjusts due to the correlation between asserted arrival times, making it possible to accurately compute the CPPR at timing test.

In a further aspect, in another embodiment, using the pre-computed common path adjust due to the correlation between asserted arrival times along with corresponding relative statistical arrival times, the method and system enables performing a statistical CPPR that includes statistical adjustment credit.

In another aspect, a method is provided for performing a static timing analysis of a circuit design in which correlations exist between asserted arrival times, that includes: a) for at least one pair or more of asserted arrival times, computing a common path credit adjust between the asserted arrival times b) determining for the one or more pairs of asserted arrival times, pair-wise relative statistical arrival times; and c) performing a subsequent CPPR analysis on at least one failing path-pair originating at the pair of asserted arrival times, during which the one or more pre-computed external common path pessimism adjusts compute one or more common path credit value at a timing test.

In still a further aspect, a system is provided for conducting a static timing analysis of a circuit design in which correlations exist between asserted arrival times, the system including: a) for at least one pair of asserted arrival times, determining a common path pessimism adjust based on correlations between the asserted arrival times; b) determining for the one or more pairs of asserted arrival times, pair-wise relative statistical arrival times and c) performing a subsequent CPPR analysis, during which the at least one pair-wise external common path pessimism adjust and pair wise relative statistical arrival times are used to compute at least one statistical common path credit value at a timing test.

BRIEF DESCRIPTION OF THE DRAWINGS

The accompanying drawings, which are incorporated in and which constitute part of the specification, illustrate the presently preferred embodiments of the invention which, together with the general description given above and the detailed description of the preferred embodiments given below serve to explain the principles of the invention.

DETAILED DESCRIPTION

The present invention and various features, aspects and advantageous details thereof are explained more fully with reference to the non-limiting embodiments that are illustrated in the accompanying drawings and detailed in the following description.

Figure 1:
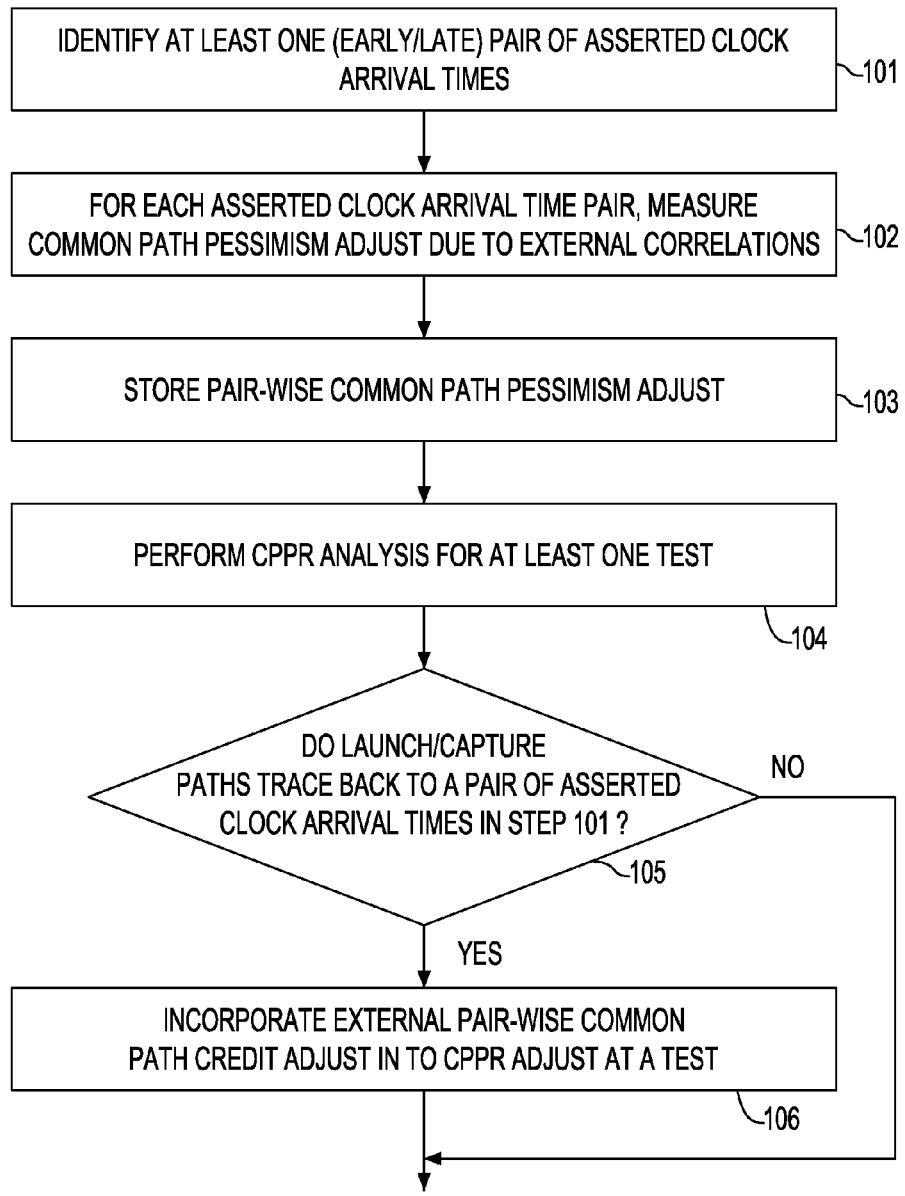
FIG. 1 shows a flowchart illustrating a first embodiment of the present invention wherein, for one or more pairs of asserted arrival times, a pair-wise common path adjust is pre-computed based on correlations between the asserted arrival times, followed by the use of at least one pre-computed pair-wise common path adjust during common path pessimism removal.

FIG. 1 shows a flowchart illustrating a first embodiment of the present invention wherein, for at least one pair of asserted arrival times, a pair-wise common path adjust is pre-computed based on correlations between the asserted arrival times, followed by the use of the pre-computed pair-wise external common path adjust during a subsequent common path pessimism removal.

In Step 101, at least one pair of asserted arrival times is identified. It is contemplated that when multiple asserted arrival times exist, the set of asserted arrival time pairs may be reduced by applying topological and/or slack based filters. For instance, if an initial timing analysis is performed in manner which is guaranteed pessimistic (e.g., assuming zero CPPR credit due to external correlations), and the out of context analysis is only intended to verify the timing paths between clocked memory elements, then CPPR credit needs to be computed only for pairs of asserted clock arrival times where the corresponding slacks computed in the initial timing analysis are both below a specified slack cutoff.

In Step 102, for each of the at least one pair of asserted arrival times which were previously identified in Step 101, a common path pessimism adjust due to correlations between the asserted arrival times is measured. Such an adjust may be computed, for example, by analyzing a network that feeds the pair of points at which arrival times are being asserted and performing a CPPR analysis on that network to determine a CPPR credit between the pair of points. An adjust value may be determined by finding physical commonality (i.e., a common subpath) within the network feeding points on which the pair of arrival times are asserted, by determining physical proximity (e.g., within a clock mesh) between these points, by determining whether the asserted arrival times are derived from the same or different transitions of a clock signal, or due to other considerations.

In Step 103, the common path pessimism adjust is stored for later use in subsequent CPPR analysis. It is possible that further common path credit relative to a pair of arrival times may be different during the same cycle (e.g., typically hold) versus the adjacent-cycle (e.g., typically setup) tests, and as a result multiple such common path credit values may be stored for a given pair of boundary arrival times.

In Step 104, a CPPR analysis is performed. Typically, tests are selected for CPPR analysis whose slack computed in an initial non-CPPR-aware timing analysis are below a slack cutoff, and the analysis of a given test may involve visiting multiple paths in the associated fan-in cone.

In Step 105, for each pair of clock and data paths analyzed by CPPR, a determination is made as to whether the path pair traces back to a pair of asserted arrival times identified in Step 101.

In Step 106, for those path-pairs which trace back to a pair of asserted arrival times identified in Step 101, the external common path credit, stored previously in Step 103, is incorporated in the CPPR credit for the given path-pair. In the simplest case, the CPPR credit for a given path-pair is equal to the external CPPR credit referenced in this step. In more general cases, where additional path-based credits are computed (e.g., for uncorrelated coupling events in the non-common early and late mode paths), the external CPPR credit may be added to the additional credit values in order to compute a final total path-pair specific to the CPPR adjust.

Figure 3:
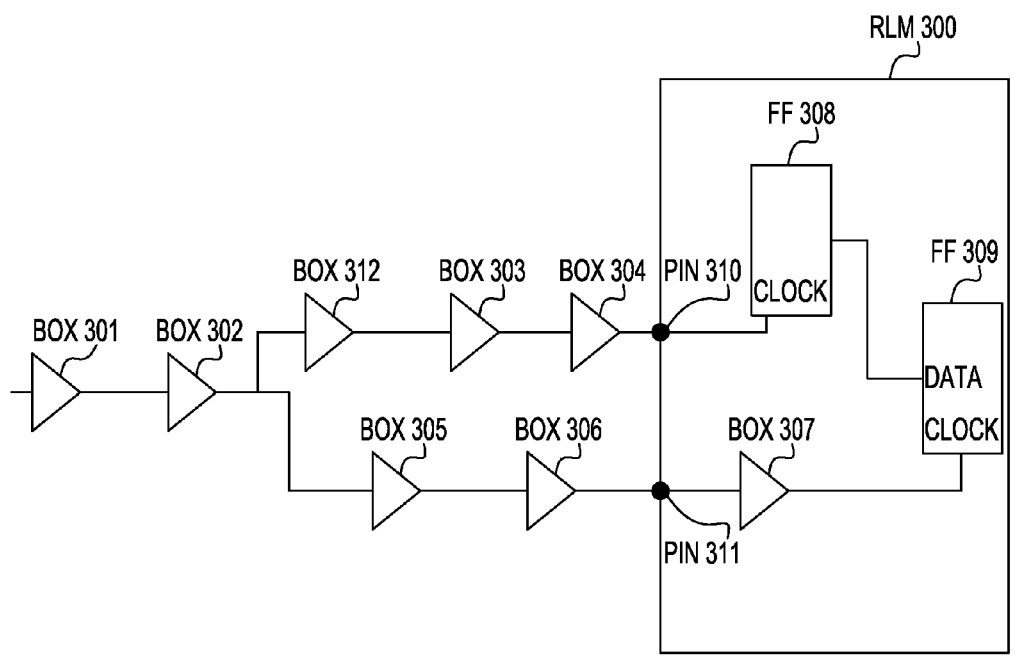
FIG. 3 illustrates an exemplary hierarchical design providing a demonstrative application of embodiments of the present invention to a hierarchical timing analysis.

Referring to FIG. 3, the following discussion illustrates how the first embodiment of the invention illustrated in FIG. 1 can be applied to a demonstrative circuit, to enable an accurate CPPR computation in hierarchical timing flow where individual macros are analyzed in an out of context fashion, as will be illustrated hereinafter with reference to FIG. 4 (i.e., analyzed in isolation, using only boundary assertions to represent top-level timing environment). For non-limiting purposes of illustration, it assumed that all circuits have an early delay of two time units and a late mode delay of eight time units, and that the entire difference between these late and early mode delays for any delay edge common to the early and late mode paths to a test may be applied as CPPR credit at that test. Moreover, for simplicity, the example assumes that the early and late arrival times at the input to BOX301 are equal to zero, all wires have zero delay, the cycle time is 30, the setup test constraint at FF309 is zero, and the slack cutoff value is zero.

Referring back to FIG. 1, in Step 101, a pair of asserted arrival times is identified consisting of the late mode arrival time for PIN310 (5*8=40) and the early mode arrival time for PIN311 (4*2=8).

Figure 5:
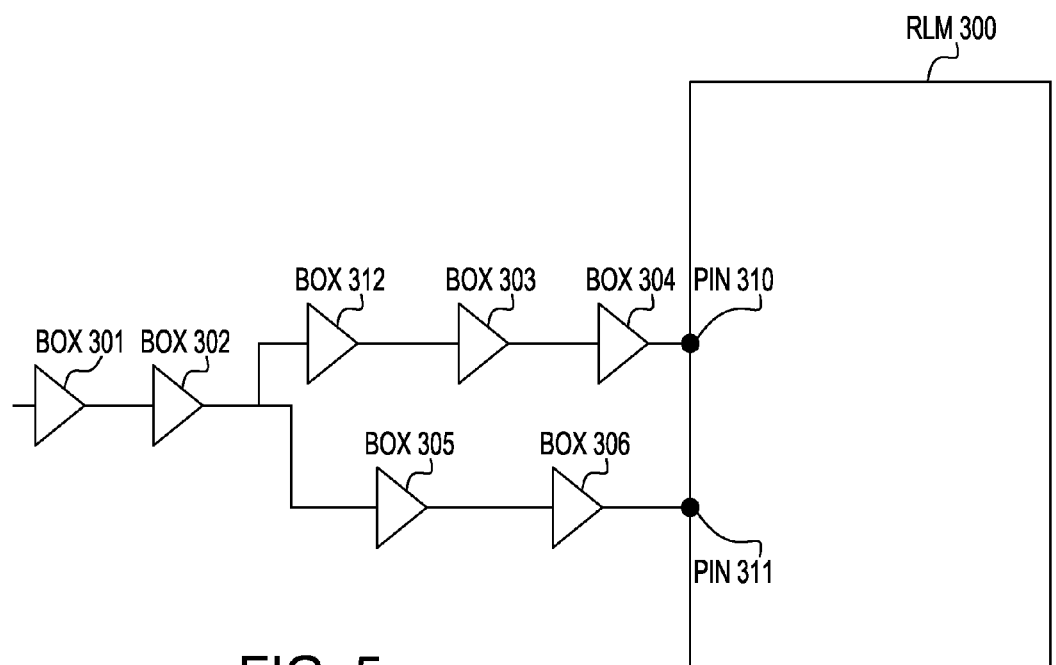
FIG. 5 illustrates a top-level timing view of the aforementioned exemplary hierarchical design.

In Step 102, a common path pessimism credit is pre-computed in the top-level timing environment (FIG. 5) with respect to a late mode AT of PIN310 and the early mode AT of PIN311. Since the critical paths leading to PIN310 and PIN311 share common circuit elements BOX301 and BOX302, the common path credit is pre-calculated by taking the difference between early and late delays for these common top-level circuit elements. Correspondingly, a common path credit value of 8−2+8−2=12 is advantageously stored for later use in the out of context CPPR analysis for RLM300 (FIG. 1, Step 103).

Still referring to FIG. 1, in Step 104, the CPPR analysis is subsequently performed in an out of context timing environment (FIG. 4) for circuits within RLM300, particularly for a timing test between late mode "data" input and early mode "clock" input of circuit element FF309. The pre-CPPR slack at FF309 is $AT_{early}$(FF309 clock)−{$AT_{late}$(FF309 data)+setup constraint−cycle time}=10−{48+0−30}=−8, which is below the specified cutoff value, and therefore CPPR analysis will be performed on this test.

In Step 105 (FIG. 1), during the out of context CPPR analysis of FF309 (FIG. 4), CPPR analyzes a late mode data path consisting of PIN310, FF308, FF309, and corresponding early mode clock path consisting of PIN311, BOX307, FF309, which trace their origin to asserted arrival time pair at PIN310 and PIN311, for which a pre-computed CPPR adjust was previously stored (Step 103).

Finally, in Step 106 (FIG. 1), for the aforementioned path-pair, the external common path credit (12 time units, stored previously in Step 103), is incorporated as the CPPR credit for timing test at FF309, adjusting the slack from −8 to +4, causing the timing test to pass.

Figure 2:
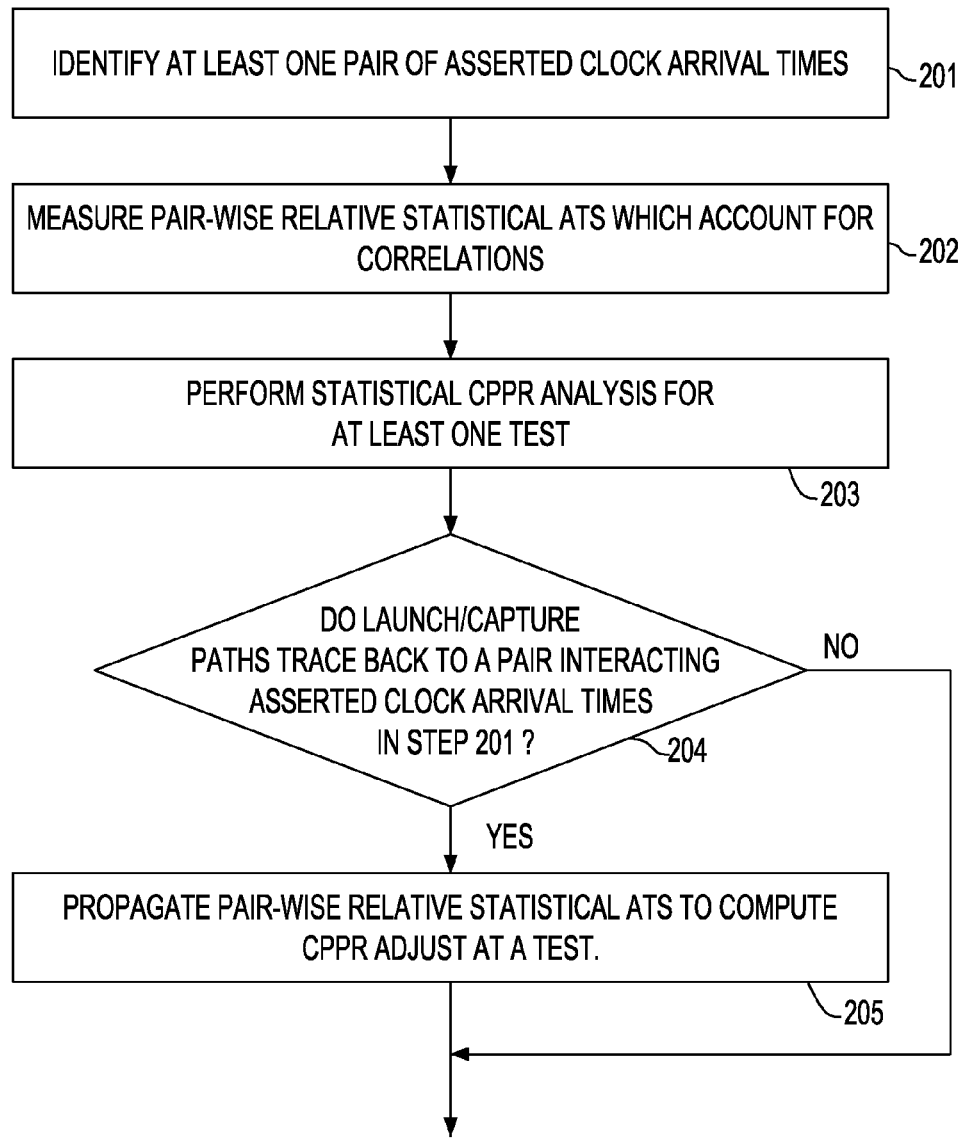
FIG. 2 shows a flowchart illustrating a second embodiment of the present invention whereby for at least one pair of asserted statistical arrival times, a pair-wise common path adjust and corresponding pair of relative statistical arrival times are pre-computed based on correlations between the asserted statistical arrival times, followed by a pre-computed pair-wise common path adjusts and corresponding relative statistical arrival times during common path pessimism removal.

Referring now to FIG. 2, a flowchart is shown illustrating a second embodiment of the present invention wherein for at least one pair of asserted statistical arrival times, a pair-wise external common path adjust and corresponding pair of relative statistical arrival times are pre-computed based on correlations thereof, followed by the use of pre-computed external pair-wise common path adjusts and corresponding relative statistical arrival times during statistical common path pessimism removal.

Still referring to FIG. 2, Step 201, at least one pair of asserted statistical arrival times is identified. As in the prior first embodiment, it is assumed that the set of asserted statistical arrival time pairs may be reduced by applying topological and/or slack based filters. For example, if the initial timing can be performed in manner which guarantees pessimism (e.g., by assuming zero common path and statistical adjustment credit due to external correlations), then the step may preferably only consider pairs of asserted statistical arrival times wherein corresponding statistical slacks, or their projected values, are both below statistical confidence value, or (in the case of using projected value of statistical arrival time) are below a specified cutoff value.

In Step 202, for each of the at least one pair of asserted arrival times which were identified in Step 201, relative statistical arrival times are preferably computed and stored which account for correlation between the asserted statistical arrival times.

In Step 203, CPPR analysis is performed. Typically end points are selected for CPPR analysis based on a slack cutoff, and the analysis of a given end point may involve visiting multiple paths in the associated fan-in cone.

In Step 204, for each pair of clock and data paths analyzed by CPPR, a determination is made as to whether the path pair traces back to a pair of asserted statistical arrival times for which relative pair-wise statistical arrival times have been pre-computed and stored in Step 203.

In Step 205, for those path-pairs for which pre-computed relative statistical arrival times are available, the relative statistical arrival times are propagated to a downstream test, in which instance a final path-pair specific CPPR adjust is computed as a function of the resulting statistical slack value resulting from the propagation of relative statistical arrival times. Alternative embodiments may also compute a CPPR-adjusted statistical test slack without explicitly computing a CPPR adjust.

Figure 4:
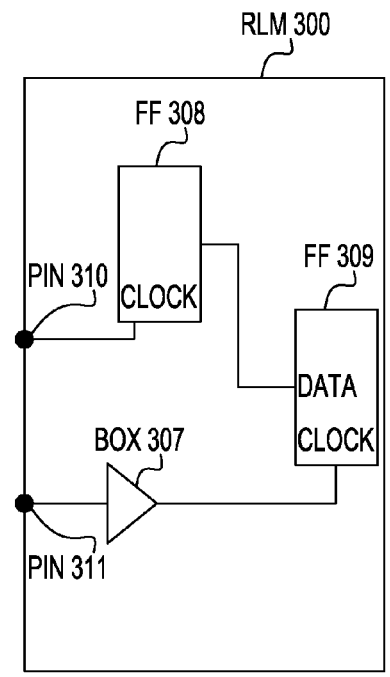
FIG. 4 illustrates an out of context view of a macro within aforementioned exemplary hierarchical design.

Referring back to FIG. 3, the following discussion illustrates how the second embodiment of the invention, as depicted with reference to FIG. 2, can be applied to the illustrative circuit, specifically to enable accurate statistical CPPR computation in hierarchical timing flow where individual macros are analyzed in an out-of-context timing environment (FIG. 4). For non-limiting purposes of illustration, it assumes that all the circuits have a mean delay of five time units, no correlated delay sensitivities, and a sensitivity of two time units per sigma of independently random variation. i.e., all delays are 5+2ΔR, where a late delay corresponds to a positive value of ΔR and an early delay corresponds to a negative value of ΔR. Furthermore, for simplicity, in the present example, it is assumed that the early and late arrival times at the input to BOX301 are equal to zero, and that all the wires have zero delay, the cycle time is 22, the setup test constraint at FF309 is zero, and the slack cutoff value is zero for minus 3-sigma slacks.

Referring back to FIG. 2, Step 201, a pair of asserted statistical arrival times is identified consisting of the late mode statistical arrival time for PIN310 and the early mode statistical arrival time for PIN311.

In Step 202, within the top-level timing environment (see FIG. 5) relative statistical arrival times are computed for PIN310 and PIN311 which account for external correlation due to a shared dependence on common circuit elements BOX301 and BOX302. In the illustrative example presently under consideration, this can be accomplished by assuming a statistical arrival time of zero at the output of BOX302 (i.e., assuming all upstream delay variations cancellable due to correlations with common circuit elements), and then propagating the arrival time forward to compute the new pair-wise relative clock boundary arrival times at PIN310 (15+2*SQRT(3)ΔR) and PIN311 (10+2*SQRT(2)ΔR). Note that the non-CPPR-aware arrival times at PIN310 and PIN311 include the delays through common circuit elements BOX301 and BOX302, and are therefore 25+2*SQRT(5)ΔR and 20+2*SQRT(4)ΔR, respectively.

In Step 203, CPPR analysis is performed in an out of context timing environment (FIG. 4) for circuits with RLM300, and in particular for a setup test between late mode "data" input and early mode "clock" input of circuit element FF309. In a pre-CPPR analysis this test would have a slack of $AT_{early}$(FF309 clock)−{$AT_{late}$(FF309 data)+setup constraint−cycle time}=25+2*SQRT(5)ΔR−{30+2*SQRT(6)ΔR+0−22}=17+2*SQRT(11)ΔR. At minus 3-sigma this would result in a slack of −2.90, which is below predetermined cutoff value of zero, and so CPPR analysis would be applied to this test.

In Step 204, during the CPPR analysis of late mode data path consisting of PIN310, FF308, FF309, and early mode clock path consisting of PIN311, BOX307, FF309, it is determined that the paths trace to different asserted arrival times (late mode arrival time of PIN310, and early mode arrival time of PIN311) for which pre-computed pair-wise relative arrival times are available from Step 203.

Finally, still referring to FIG. 2, Step 205, the pair-wise relative arrival times (from Step 202) at PIN310 (15+2*SQRT(3)ΔR) and PIN311 (10+2*SQRT(2)ΔR) are propagated to the downstream test at FF309. This results in a statistical arrival time at the FF309 "data" input of (20+2*SQRT(4)ΔR), a statistical arrival time at "clock" input of FF309 of (15+2*SQRT(3)ΔR), and a CPPR-adjusted statistical test slack of $AT_{early}$(FF309 clock)−{$AT_{late}$(FF309 data)+setup constraint-cycle time} = 15+2*SQRT(3)ΔR−{20+2*SQRT(4)ΔR+0−22} = 17+2*SQRT(7)ΔR. At minus 3-sigma this would result in a slack of +1.13. A CPPR adjust may then be computed as the difference between the CPPR-adjusted and pre-CPPR minus 3-sigma slacks (1.13−(−2.90)=+4.03).

The present invention can be realized in hardware, software, or a combination of hardware and software. The present invention can be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

While the present invention has been particularly described in conjunction of a simple illustrative embodiment, it is to be understood that one of ordinary skill in the art can extend and apply this invention in many obvious ways. In the above embodiments example, for purposes of clarity, rising and falling timing quantities were not differentiated, but one of ordinary skill in the art could apply the present invention to a situation with different rising and falling delays, slews, ATs and RATs. The invention applies to any type of static timing, including but not limited to deterministic or statistical static timing of gate-level circuits, transistor-level circuits, hierarchical circuits, circuits with combinational logic, circuits with sequential logic, timing in the presence of coupling noise, timing in the presence of multiple-input switching, timing in the presence of arbitrary timing tests such as setup, hold, end-of-cycle, pulse width, domino, clock gating and loop-cut tests, and timing in the presence of multiple clock domains. It is also to be understood that while the above embodiments focus mainly on a single path pair for CPPR analysis, other embodiments of the invention can be adapted to any number of path-pairs incident upon a test, it is evident that many alternatives, modifications and variations will be apparent to those skilled in the art in light of the present description. It is therefore contemplated that the appended claims will embrace any such alternatives, modifications and variations as falling within the true scope and spirit of the present invention.

What is claimed is:

1. A method of performing a statistical static timing analysis of a circuit design in which correlations exist between statistical arrival times of one or more pair of inputs to a hierarchical module, comprising:

a) using a computer to perform a first analysis of a network containing an instance of said hierarchical module for identifying said correlations between said statistical arrival times at said one or more pairs of inputs of said hierarchical module;

b) generating asserted arrival times at said pair of one or more pairs of inputs of said hierarchical module based on said identified correlations;

c) performing a second analysis of said hierarchical module for propagating timing values dependent on said generated asserted arrival times, said second analysis excluding any network external to said hierarchical module; and d) performing a subsequent statistical common path pessimism removal (CPPR) analysis for at least one test during which said timing values dependent on the one or more generated asserted arrival times are used to compute an adjusted statistical test slack.

2. The method as recited in claim 1, wherein said propagated timing value comprises pair wise relative arrival times.

3. The method as recited in claim 2, further comprising computing a CPPR-adjusted slack based on at least one of the pair wise relative arrival times.

4. The method as recited in claim 2 wherein said pair wise relative arrival times are computed only for pairs of points meeting a slack filtering criterion.

5. The method as recited in claim 1, wherein said propagated timing value comprises a CPPR credit.

6. The method as recited in claim 5, further comprising computing said CPPR-adjusted slack based on at least one of said CPPR credits.

7. The method as recited in claim 5 wherein said CPPR credit is computed only for pairs of points meeting a statistical slack filtering criterion.

8. The method as recited in claim 1, wherein said correlations between said pairs of statistical asserted arrival times are caused by physical commonality in a network external to a hierarchical module.

9. The method as recited in claim 1, wherein said one or more pairs of statistical asserted arrival times are on clock signals.

10. The method as recited in claim 9, wherein said correlations between said statistical asserted pairs of arrival times are caused by physical proximity within a clock network.

11. The method as recited in claim 9, wherein said correlations between said statistical asserted pairs of arrival times are caused by timing assertions derived from different clock transitions.

12. The method as recited in claim 1, wherein said CPPR analysis is performed for at least one test in an out of context environment.

13. The method as recited in claim 1, further comprising tracing launch and capture paths for at least one timing test to pair of hierarchical boundary arrival times.

14. The method as recited in claim 1, wherein the step of identifying one or more pairs of said statistical asserted arrival times further comprises determining an external statistical common path pessimism adjust for each of the one or more pairs of said statistical asserted arrival times.

15. The method as recited in claim 1, wherein said circuit design comprises at least one of clock trees and clock meshes.

16. The method as recited in claim 1 wherein said common path credit in said statistical static timing analysis of a hierarchical design partition is applied in the presence of different rising and falling delays, slews, arrival times, required arrival times, and a plurality of phases.

17. The method as recited in claim 1 wherein said statistical static timing analysis comprises at least one of deterministic and statistical static timing analysis.

* * * * *